June 15, 1926. 1,588,471
Z. BEZKOROWAJNYJ
SPRING GRIPPING DEVICE
Filed Dec. 18, 1922
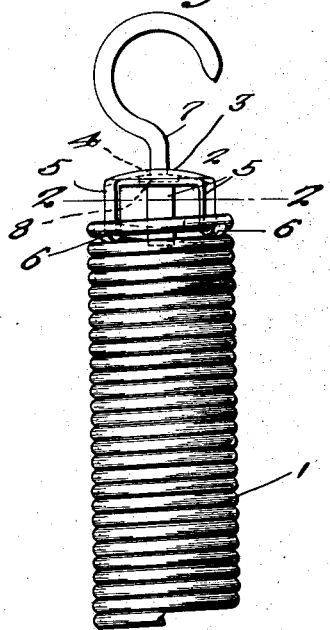
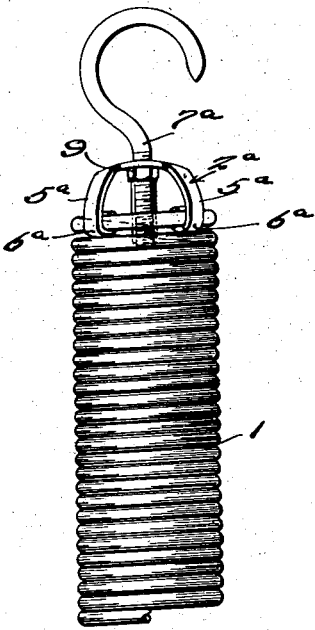
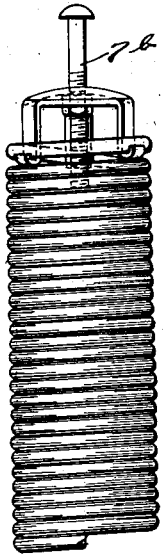
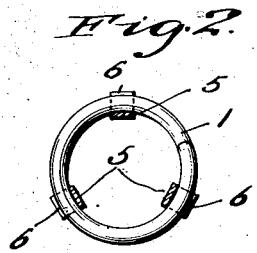
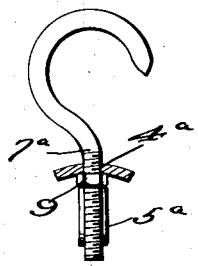
Zachary Bezkorowajnyj, INVENTOR
BY Victor J. Evans
ATTORNEY
WITNESSES Patented June 15, 1926.

1,588,471

UNITED STATES PATENT OFFICE.

ZACHARY BEZKOROWAJNYJ, OF LYONS, NEW YORK.

SPRING-GRIPPING DEVICE.

Application filed December 18, 1922. Serial No. 607,750.

The object of my said invention is the provision of a device in the nature of a swivel device for gripping a coiled spring and for use in connecting one end of the spring to another machine element or to any other device to which the spring is to be connected.

To the attainment of the foregoing, the invention consists in the improvement as hereinafter described and definitely claimed.

In the accompanying drawings, forming part of this specification:—

Figure 1 is an elevation illustrating a portion of a coiled spring, and my novel device associated therewith.

Figure 2 is a horizontal section taken in the plane indicated by the line 2—2 of Fig. 1, looking downwardly.

Figure 3 is a view similar to Figure 1 showing a modification.

Figure 4 is a sectional view of the same.

Figure 5 is an elevation illustrating another modification.

Similar numerals designate corresponding parts in Figures 1 and 2 to which reference will first be made.

1 is a coiled spring, and 2 is the body of my novel spring gripping device. The said body includes a central portion 3 with an aperture 4 therein, and an appropriate number of arms 5 reaching from the central portion 3 and terminating in end portions 6 adapted to be introduced between convolutions of the spring as illustrated. In applying the body of the device to a spring such as 1, the arms 5 are arranged within the end convolution of the spring, and the end portions 6 on the said arms 5 are made to extend outwardly from the arms 5 and rest between the said end convolution and the next adjacent convolution. Manifestly when so applied the body 2 will be strongly connected of itself to the spring 1 and without liability of casual disconnection. It will also be apparent that when it is considered that the arms 5 are bendable, the connection of the body 2 to the spring may be quickly and easily effected. In addition to the body 2 my novel device comprises a swivel connector 7. As shown the said connector is in the form of a hook, and its shank is disposed in the aperture 4 of the body 2 and it is provided with an enlargement 8 designed to rest against the inner side of the central portion 3 of the body, so that the said body and the spring may be quickly and strongly connected to any desired object.

In the modification shown in Figures 3 and 4, the body $2^a$ is apertured at $4^a$ and is provided with arms $5^a$ on which are end portions $6^a$ to engage a convolution of the spring 1, the said end portions $6^a$ being in the form of inwardly-directed hooks as shown. Obviously in the application of this body $2^a$ to a spring the arms $5^a$ are adapted to rest about the end portions of the spring. In association with the said body $2^a$ I prefer to employ a swivel connector $7^a$ having a threaded shank to extend through the aperture of the body $2^a$ and also having a nut 9 on the said shank and adapted to bear against the under or inner side of the body portion $2^a$.

In Figure 5 I show a swivel connector $7^b$ which is in the form of a headed bolt having a threaded shank and a nut thereon.

At this point I would have it understood that it is within the purview of my invention to employ any one of the connectors shown and described in combination with either of the bodies 2 or $2^a$ as conditions require.

Manifestly my novel device is in the nature of a swivel coupling which may be lengthened or shortened by means of a nut on the under side of the body in which there are openings between the arms of the body which allow of easy adjustment and the body can be made larger or smaller by either pressing open the arms of same or pressing them down and thus making them smaller so that the same device may be used upon different sizes of coil spring. Also there are two styles an outside connection and an inside connection. The inside one is all within the coil spring except the small clasps from within thus leaving the outside of the coil spring clear and free from interference. These is hook swivel and a plain straight swivel. The plain straight swivel is adjustable both from within the coil and also at the top of same. These adjustments can all be made without releasing the coil and without interference of any kind and without removing the device from the spring.

It will be appreciated from the foregoing that my novel spring gripping device is extremely simple and inexpensive in construction and yet is adapted for easy application, and is also adapted to strongly and securely connect a coiled spring to any element or device to which it is desired to attach the spring.

I have entered into a detailed description of the construction and relative arrangement of the parts embraced in the present and preferred embodiments of my invention in order to impart a full, clear and exact understanding of the said embodiments. I do not desire, however, to be understood as confining myself to the specific construction and relative arrangement of parts inasmuch as in the future practice of the invention various changes and modifications may be made such as fall within the scope of my invention as defined in my appended claim.

Having described my invention, what I claim and desire to secure by Letters-Patent, is:—

As a new article of manufacture, a device for attaching a coil spring to another device, comprising a body of substantially arcuate shape formation and being formed with a central circular aperture, depending arms extending and radiating from the outer edge of said body, curved hook like ends formed on the lower end of said arms and adapted to receive the end convolution of the coil spring, and a connector extending through and above said aperture and being swiveled in the same, said connector having its upper end hook shaped for connection of itself to another device, and a nut threaded upon said connector below the body for engaging the underside thereof to prevent longitudinel movement of said connector in a direction away from the spring only.

In testimony whereof I affix my signature.

ZACHARY BEZKOROWAJNYJ.